(12) United States Patent
Fontan et al.

(10) Patent No.: US 9,094,649 B2
(45) Date of Patent: Jul. 28, 2015

(54) ADAPTING DIGITAL VIDEO RECORDING BASED UPON FEEDBACK

(75) Inventors: Antonio Fontan, San Jose, CA (US); Tim Herby, Los Altos, CA (US); Christopher Habliston, San Jose, CA (US); Alan Merzon, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 245 days.

(21) Appl. No.: 13/305,499

(22) Filed: Nov. 28, 2011

(65) Prior Publication Data
US 2013/0136424 A1 May 30, 2013

(51) Int. Cl.
| | |
|---|---|
| H04N 5/76 | (2006.01) |
| H04N 9/82 | (2006.01) |
| H04N 21/4147 | (2011.01) |
| H04N 21/466 | (2011.01) |
| H04N 21/45 | (2011.01) |
| H04N 5/782 | (2006.01) |

(52) U.S. Cl.
CPC .............. *H04N 5/76* (2013.01); *H04N 9/8205* (2013.01); *H04N 21/4147* (2013.01); *H04N 21/4668* (2013.01); *H04N 5/782* (2013.01); *H04N 21/4532* (2013.01)

(58) Field of Classification Search
CPC .......... H04N 21/4147; H04N 21/4532; H04N 21/4668; H04N 5/76; H04N 5/782; H04N 9/8205; G06F 8/65; G06F 9/542
USPC .................................................. 386/291–299
See application file for complete search history.

(56) References Cited

U.S. PATENT DOCUMENTS

| | | | |
|---|---|---|---|
| 7,028,323 B2 | 4/2006 | Franken et al. | |
| 7,567,747 B2 | 7/2009 | Hira | |
| 2004/0003405 A1 | 1/2004 | Boston et al. | |
| 2006/0253867 A1* | 11/2006 | Potrebic et al. | 725/50 |
| 2008/0320510 A1 | 12/2008 | Wong et al. | |
| 2009/0178071 A1 | 7/2009 | Whitehead | |
| 2009/0259519 A1* | 10/2009 | Cronin et al. | 705/10 |

(Continued)

OTHER PUBLICATIONS

Korst, et al., "Scheduling TV Recordings for a Recommender-Based DVR", Retrieved at <<http://ieeexplore.ieee org/stamp/stamp. jsp?arnumber=05523716>>, IEEE 14th International Symposium on Consumer Electronics (ISCE), Jun. 7-10, 2010, pp. 1-6.

(Continued)

*Primary Examiner* — Nigar Chowdhury
(74) *Attorney, Agent, or Firm* — Bryan Webster; Kate Drakos; Micky Minhas (57) ABSTRACT

Embodiments related to the use of feedback to adapt digital video recording are disclosed. For example, one disclosed embodiment provides, on a computing device, a method of adapting an identification and scheduling of video items for recording based on usage. The method comprises detecting a trigger to perform a series update, and determining one or more video items to record as a part of a series by providing input to a series update module that returns candidate video items for inclusion in the series. The method further comprises scheduling zero or more of the candidate video items for recording, receiving feedback related to video item playback of one or more video items that were recorded based upon the scheduling, and based upon the feedback, adapting the input provided to the series update module for a later series update.

16 Claims, 5 Drawing Sheets

(56) References Cited

U.S. PATENT DOCUMENTS

2010/0272413 A1 10/2010 Bhogal et al.
2010/0277606 A1 11/2010 Deluca et al.
2011/0299836 A1* 12/2011 Amsterdam et al. .......... 386/295
2013/0223816 A1* 8/2013 Gharaat et al. ................ 386/249
2013/0272682 A1* 10/2013 Barton .......................... 386/291

OTHER PUBLICATIONS

Hu, et al., "Collaborative Filtering for Implicit Feedback Datasets", Retrieved at <<http://www2.research.att.com/~yifanhu/PUB/cf.pdf>>, Eighth IEEE International Conference on Data Mining, ICDM, Dec. 15-19, 2008, pp. 263-272.

* cited by examiner

ADAPTING DIGITAL VIDEO RECORDING BASED UPON FEEDBACK

BACKGROUND

Video content may be obtained from a variety of sources, including linear and non-linear sources. Linear content sources, such as broadcast television channels, provide content according to a specified schedule, whereas non-linear sources allow users to access available content on demand.

Digital video recorders (DVRs) may be utilized by television viewers to allow linear content to be consumed in an on-demand manner. DVRs may allow users to elect to record single instances of shows, or a series of episodes of a show by identifying the series. Users may locate such shows and series for recording by searching by title and/or series identification. After recording, a user may view a user-selectable list of recorded series and/or shows to choose a show for playback. In this manner, a DVR may provide a user with the option of watching linear content whenever and as often as desired.

SUMMARY

Various embodiments are disclosed herein that relate to the use of feedback to adapt digital video recording. For example, one disclosed embodiment provides, on a computing device, a method of adapting an identification and scheduling of video items for recording based on usage. The method comprises detecting a trigger to perform a series update, and determining one or more video items to record as a part of a series by providing input to a series update module that returns candidate video items for inclusion in the series. The method further comprises scheduling zero or more of the candidate video items for recording, receiving feedback related to video item playback of one or more video items that were recorded based upon the scheduling, and based upon the feedback, adapting the input provided to the series update module for a later series update.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, a DVR system may be utilized by television viewers to allow linear content to be consumed in an on-demand manner. Current DVRs may allow users to elect to record a series of episodes of a show by identifying the series. Upon selecting a series for recording, the automatic updating of the recording of the series may be triggered by receipt of an updated electronic programming guide (EPG) by the DVR system. In this manner, the recording of the series may automatically be kept up-to-date.

However, the definitions of series utilized by current DVR systems may be limited to multi-episode linear content series, such as television series. Thus, users wishing to view related non-linear content may have to seek out such content via other avenues, such as a through a computer network.

Embodiments are disclosed herein that relate to defining series other than traditional linear content series for automatic recording by a DVR system, and to using feedback to adapt and/or score such series based upon usage. Briefly, the disclosed embodiments allow for the definition of a DVR series type by other algorithms than a television series identification search algorithm. The disclosed embodiments may allow virtually any algorithm configured to run when triggered and return a list of potential candidate video items to be used to locate video items to record as a series. Such algorithms may also be referred to herein as series update modules. Examples of such series update modules may include, but are not limited to, series update modules that define series by subject matter, by social network, by recommendation, by popularity, and the like. Such series may include either or both of linear content and non-linear content. The term "linear content" as used herein signifies content that is available according to a specified schedule (such as broadcast television content), and the term "non-linear content" signifies content that is available on demand.

The series update module may pass the resulting list of candidates on to a scheduler that selects which candidates to schedule for recording. The scheduler also may track recording history so that previously recorded candidates provided by the series update module are not again recorded. Through such series update modules, types of series other than traditional linear series may be defined, recorded, and enjoyed in an integrated user experience with linear series. It will be understood that the update modules may be run on client digital video recording devices, and/or on a remote multi-user digital video recording service configured to schedule recordings for client devices, as discussed in more detail below. Likewise, it will further be understood that recording of scheduled shows may be performed local to each client DVR device, and/or as a network-accessible cloud-based service that may be shared across customers and/or that allocates storage per customer. Such a recording service may or may not be combined with the scheduling service.

Feedback may be used to adapt the operation of series update modules based upon usage. This may help the update modules, over time, to surface relevant content more quickly. Further, the use of feedback to score the update modules and/or series that utilize the update modules may help to provide viewers, content recommenders, content producers and other parties more information regarding the popularity and functionality of update modules. This may allow such parties to originate and/or choose to record series that utilize update modules with proven functionality in surfacing popular content.

Figure 1:
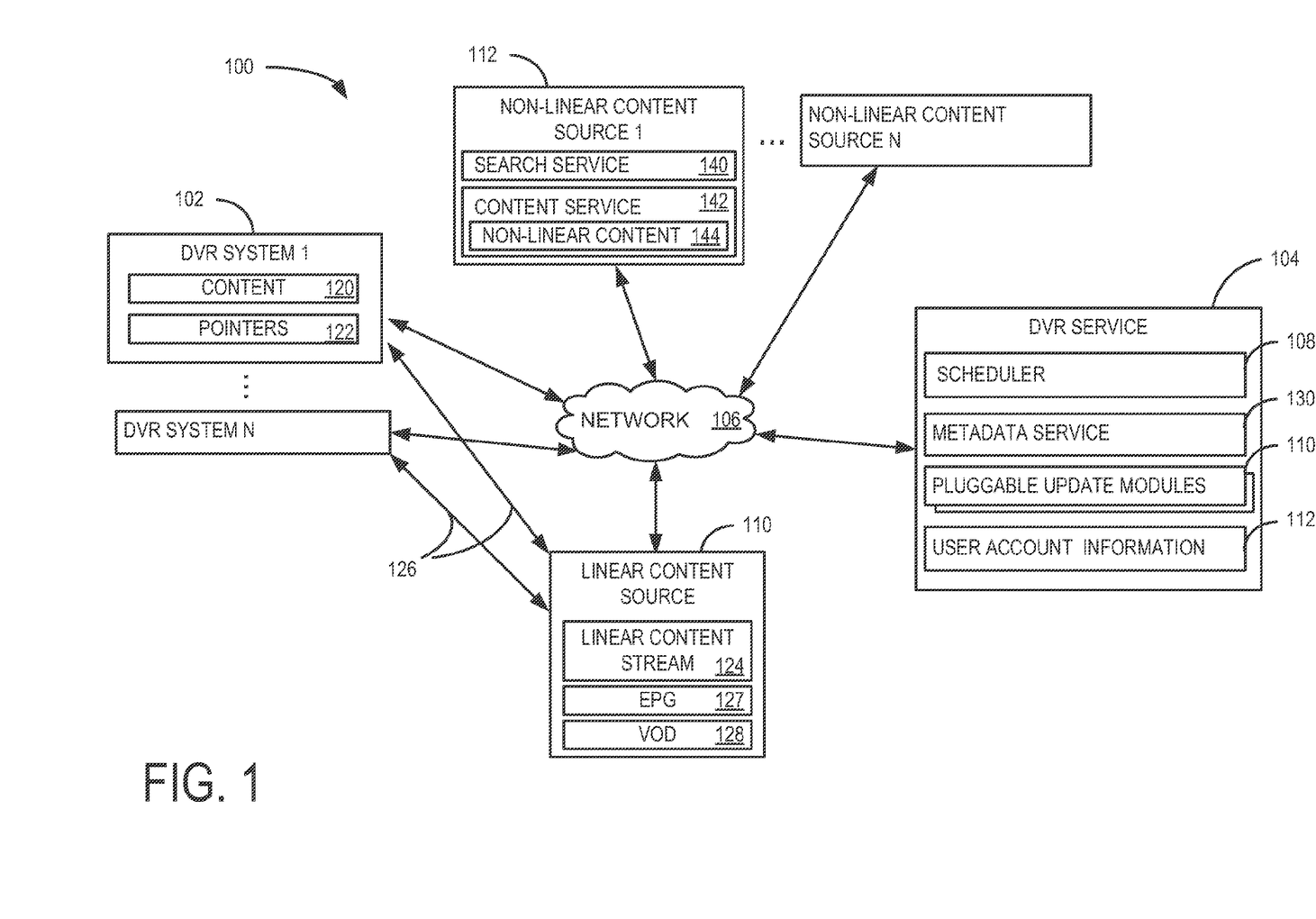
FIG. 1 shows an embodiment of an example use environment for a multi-user DVR service.

Prior to discussing these embodiments in more detail, an embodiment of an example use environment 100 is described with reference to FIG. 1. Use environment 100 comprises a plurality of DVR systems 102, illustrated as an arbitrary number n of DVR systems. Each DVR system 102 is connected to a remote DVR service 104 via a network 106. As discussed in more detail below, the remote DVR service 104 may be configured to schedule recordings of video items for each DVR system 102 via a scheduler 108 based upon candidates received from update modules 110 and user account information 112 stored on the remote DVR service 104 for each DVR system 102. The video items scheduled for recording may be obtained from one or more linear content sources 114, and also one or more non-linear content sources 116. It will be understood that, in other embodiments, tasks described herein as being performed by DVR service 104 may be performed locally on each DVR system 102, or distributed between the DVR service 104 and each DVR system 102. For example, in some embodiments, scheduling may be performed via update modules located on client DVR systems 102, and the remote DVR service 104 may aggregate information, such as playback statistics, provided by the client DVR systems 102 for adapting the scheduling of series based upon usage.

Each DVR system 102 is configured to record scheduled programs, and also to play back recorded programs upon user request. Each DVR system therefore may comprise recorded video content 120. Further, each DVR system may be configured to store pointers 122 that point to available non-linear content. With regard to non-linear content, as such content may be available on-demand, the content may be accessed at any time without recording a local copy. Therefore, in such instances, local storage space may be conserved by storing a pointer 122 to a non-linear content item, rather than a copy of the non-linear content item. In other instances, a copy of a non-linear content item may be stored instead of a pointer, e.g. if a non-linear content item is due to expire (e.g. will no longer be available at a content source), if a network connection between a DVR system and a non-linear content source is unreliable, if local storage is preferred by a user, etc. In either case, this may allow DVR systems 102 to present linear and non-linear content in an integrated user experience.

The linear content source 114, as mentioned above, provides a stream of linear scheduled content 124, such as a plurality of television broadcasts, to each DVR system 102. The linear content source may provide such content to each DVR system 102 via a direct channel 126, and/or via computer network 106. Examples of suitable linear content sources 114 include, but are not limited to, cable television and satellite television providers. The linear content source 114 further may provide other information to DVR systems 102, such as an electronic programming guide 127 ("EPG"), and non-linear content by video on demand (VOD) 128. The direct channel 126 may take the form of a coaxial cable, fiber optic cable, satellite link, and/or any other communication channel suitable for delivering linear content. While the embodiment of FIG. 1 depicts a single linear content source 114 for clarity, it will be understood that DVR systems 102 also may receive linear content from more than one linear content source.

The DVR service 104 may further comprise a metadata service 130 for storing and searching metadata related to content available for recording and/or playback. The metadata service 130 may be configured to receive content requests from the scheduler 108, and in response, to obtain information regarding the availability of content that matches the requests. The metadata service 130 may query locally stored metadata and/or external content sources. Locally stored metadata may include previously received information, such as information from EPG 127 from linear content source 114, for example. It will be understood that metadata service 130 also may be located remotely from the DVR service 104.

Each external non-linear content source 116 likewise may include a search service 140 with which the metadata service 130 can interface to discover available content on the non-linear content source through queries. Further, each external non-linear content source also comprises a content service 142 configured to deliver non-linear content 144 to end-user devices, such as DVR systems 102. Examples of suitable non-linear content sources include, but are not limited to, television content web sites, movie content web sites, user-uploaded video web sites, and social networking web sites.

As mentioned above, in some embodiments, each update module 110 comprises logic that may be used to locate potential candidate video items (e.g. by presentation time/channel, network location/URL, and/or any other suitable information) to record as a part of a series. It will be understood that each candidate may or may not eventually be recorded, and the decision regarding whether to schedule the recording of each identified candidate may be performed by the update module, by a different module (e.g. scheduler 108), by logic residing on a DVR system 102, and/or in any other suitable manner. It further will be understood that the candidate video items may comprise individual episodes/shows, as well as series of shows in some embodiments.

As mentioned above, an update module may be configured to perform any suitable algorithm to identify content for recording. As a nonlimiting example, an update module 110 may be configured allow a series to be defined as a trend group, such that anytime a content item becomes popular among a threshold number of members (or weighted threshold number of members, as described below) of the trend group, that content item is automatically recorded for all members of the trend group. As another nonlimiting example, an update module 110 may be configured to allow a user to define another type of trend group in the form of a user-defined trend group, such that when a content item becomes popular among members of the user-defined trend group, that content item is automatically recorded for just the user that defined the user-defined trend group. It will be understood that the term "trend group" as used herein may signify any group of DVR users in which the activity of some group members regarding a selected video item may trigger the recording of the selected video item for one or more other users.

As yet another example of an update module, a series update module 110 may be configured to allow a series to be defined as a feed (e.g. an RSS feed (RDF Site Summary, or Really Simple Syndication)) provided by a person (e.g. a celebrity or friend) in which the person provides a feed of recommended video items. As a further example, a series update module 110 may be configured to allow a series to be defined by subject matter (e.g. a favorite sports team, actor/actress, etc.). It will be understood that these update modules are described for the purpose of example, and not intended to be limiting in any manner.

As mentioned above, feedback may be used to adapt and/or score update modules and series. Such adaption may allow an update module to surface relevant content more effectively for series utilizing that update module. Any suitable feedback may be used. For example, the feedback may comprise information regarding whether recorded video items are played. Such information may then be used to determine playback statistics such as a total percentage of shows watched out of shows recorded/recommended. This information may allow the DVR service 104 to know which series update modules are most effective in surfacing content that is played, and therefore may allow promotion of those series update modules. As another example, such information also may be used to determine a percentage of viewers that watched any one show that was recorded for those viewers. This information may allow the series update modules to tune their recommendations, which may help to provide more popular recommendations over time.

The feedback also may include information regarding whether video items played receive positive and/or negative user feedback. For example, a user may be allowed to rate a recorded show during or after playback of the show, such as by "like" and "dislike" actions or similar actions. Such information may then be used to determine playback statistics regarding the popularity of individual shows surfaced by a series update module, and/or the popularity of all shows surfaced by a series update module.

The feedback may further comprise information regarding an amount of usage received by each series update module. Such information may be utilized to determine, for example, a percentage of DVR viewers utilizing each update module, a mean number of instances of each update module per viewer using the update module, and/or a percentage of users who have used the update module who delete their last instance of it. It will be understood that the specific types of feedback information and playback statistics described above are presented for the purpose of example and are not intended to be limiting in any manner, as any suitable type of feedback may be collected to determine any suitable type of statistical information.

Figure 2:
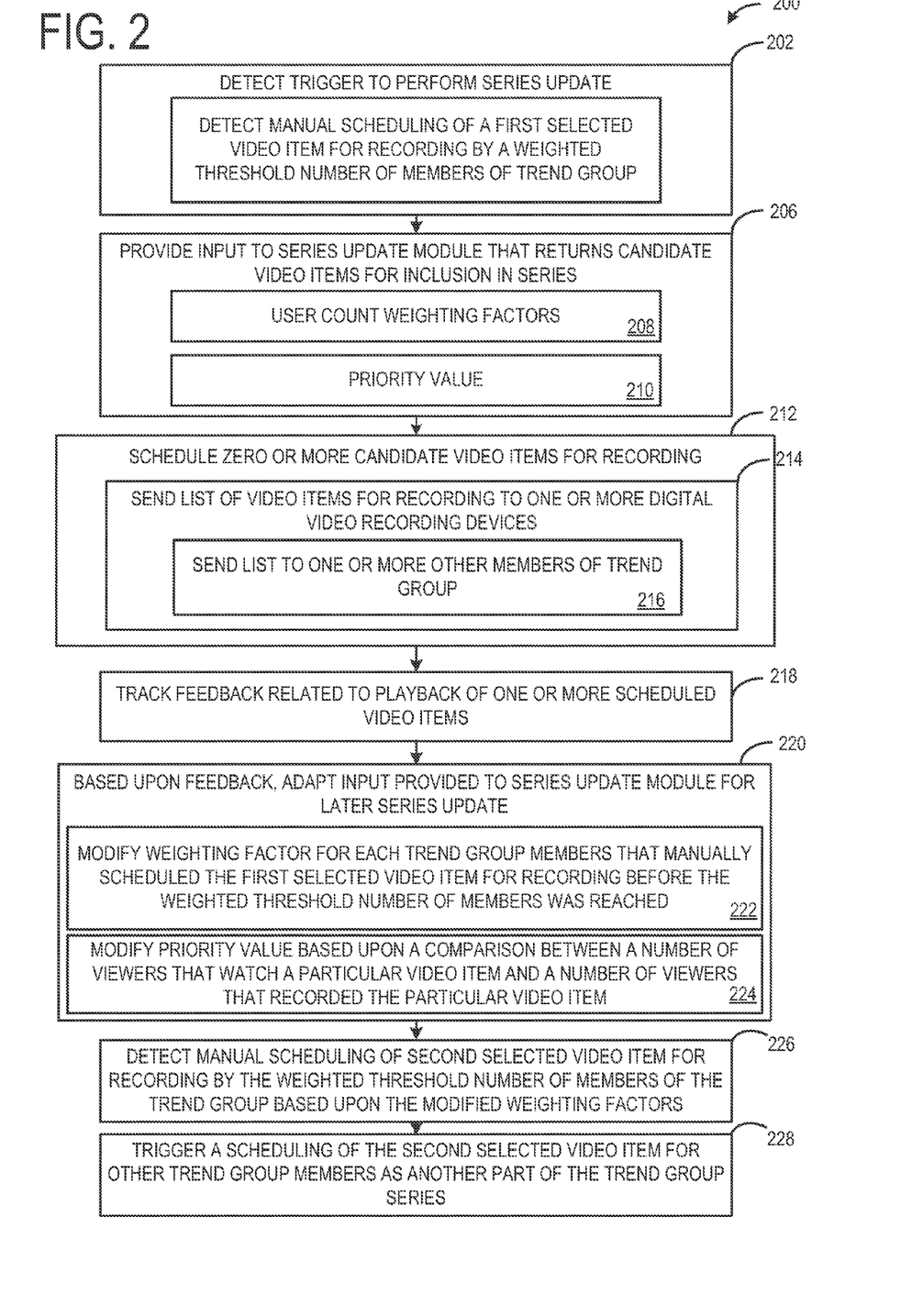
FIG. 2 shows an embodiment of a method of adapting the identification and/or scheduling of video items for recording based on usage.

The feedback may be utilized to adapt an operation of a series update module in any suitable manner. FIG. 2 shows a flow diagram depicting one example embodiment of a method 200 of adapting an identification and/or scheduling of video items for recording based on usage feedback. While various processes of method 200 are described in the context of trend group series and/or feed series, it will be understood that method 200 may be used with any other suitable type of series. It further will be understood that method 200 may be performed by the DVR service 104, by a client DVR device 102, by logic distributed between these devices, and/or by another other suitable hardware and/or software.

Method 200 comprises, at 202, detecting a trigger to perform a series update. Any suitable trigger may be used to trigger a series update, and different series update modules may utilize different triggers. For example, as indicated at 204, a series update module may comprise a logging module that tracks trend group activity, and that triggers the automatic scheduling of a recording of a selected first video item for one or more trend group members upon determining that a weighted threshold number of other trend group members have manually scheduled the recording of the selected first video item. The weighted threshold number of trend group users may be determined by applying a user count weighting factor to each user of the trend group. The user count weighting factor may be adjusted based upon feedback, as described in more detail below.

As another example of a trigger, a series update module configured to locate and schedule linear content (for example, by series identification or subject matter) may be triggered by receipt of an updated electronic programming guide (EPG). As yet another example, a time-based trigger (e.g. a periodic timer) may be used to trigger the updating of a feed-based series update module. It will be understood that these triggering events are described for the purpose of example, and are not intended to be limiting in any manner.

Upon detection of the trigger, method 200 comprises, at 206, providing input to a series update module that returns candidate video items for inclusion in the series. The input may include information that identifies the specific series being updated (e.g. the identity of the trend group, the identity of the feed provider, the identity of the subject matter of a subject matter series, etc.) so that relevant video items are located. Likewise, the input also may include weighting factors, such as the above-mentioned user count weighting factors 208, priority values 210 based on a popularity of a video item from previous viewings, and/or any other suitable information.

As mentioned above, the user count weighting factors 208 may be used to modify the weighting of the count of trend group users when determining whether to trigger the scheduling of a trend group recording. By modifying the user count weighting factor 208 for a user that selects to manually view a video item that later becomes a trend group recording (i.e. a "trendsetting" user), that user will count more towards identifying future trends. Thus, over time, users that consistently manually select to record shows that become trend recordings count more toward the weighted threshold number of trend group users than other trend group members. In some embodiments, only trend-sourced shows that are played, or played and "liked" (e.g. receive positive feedback), may count toward the modification of the user count weighting.

A trend group update module may determine when to trigger the automatic recording of a video item for group members in any suitable manner. For example, in some embodiments, the weighted user count values (e.g. the weighting factor multiplied by a default user count value, e.g. one) may be summed for all trend group members that manually select the recording of a show, and the sum may be divided by a total sum of all weighted user count values of that trend group. Once this ratio exceeds a threshold ratio, the automatic recording of the video item for other trend group members may be triggered.

Continuing with FIG. 2, method 200 next comprises, at 212, scheduling zero or more candidate video items for recording. A video item candidate may not be scheduled for recording for a user, for example, if the user has previously black-listed the item or a series that includes the item, if the recording of the video item would conflict with the recording of another video item of higher priority, or for any other suitable reason. In embodiments where the scheduling is performed by remote DVR service 104, method 200 may then comprise, at 214, sending a list of video items for recording to one or more digital video recording devices, wherein the list includes the items scheduled at 212. In the particular instance of a trend group series, the list is sent to one or more other trend group members, as indicated at 216. In embodiments where the scheduling is performed on a client DVR device 102, processes 214 and/or 216 may be omitted.

After sending the list of video items to the one or more digital video recording devices, method 200 comprises, at 218, tracking feedback regarding playback of one or more recorded video items. For example, where the scheduling is performed on remote DVR service 104, tracking feedback may comprise receiving feedback from one or more client DVR devices 102. Likewise, where scheduling is performed on client DVR devices 102, tracking feedback may comprise sending feedback to the remote DVR service 104. Method 200 further comprises, at 220, adapting input that will be provided to the series update module for a later series update based upon the feedback. For example, as indicated at 222, in the case of a trend group, the weighting factors of each trend group member that manually selected recording of the selected first video item before the weighted threshold was reached may be increased (e.g. by awarding a point or fraction of a point) to that trend group member, thereby forming modified weighting factors. The modification of a user's user count weighting factor may be applied to all trend groups of which that user is a member, or may be specific to the trend group for which the scheduling of the first video item was triggered. Applying the modification locally may help to avoid a user's weighting factor from a small trend group from having outsized influence in other, larger trend groups. Likewise, applying the modification universally may allow each user to have a universal "score" that can be displayed to other users, and that may be used for as the basis for awards. It will be understood that such modifications may be performed on remote DVR service 104, client DVR devices 102, distributed between these devices, or in any other suitable manner.

As another example of the modification of an input to the series update module, as indicated at 224, a priority value of a video item may be modified based upon a comparison between a number of viewers that watch a particular video item and a number of viewers that recorded the particular video item. This priority value may then be used to set priority in future scheduling of that video item.

In this manner, feedback may be used to adapt the operation of series update modules such that relevant video content may be surfaced more rapidly and reliably by the series update modules. For example, continuing with the trend series example, method 200 may comprise, at 226, detecting the manual scheduling of a second selected video item for recording by the weighted threshold number of members of the trend group based upon the modified weighting factors. In response, method 200 comprises, at 228, triggering the scheduling of the second selected video item for other trend group members as another part of the trend group series, wherein the triggering may have occurred at a lower actual user count due to the modifications made to the weighting factors.

As mentioned above, in addition to utilizing feedback to adjust the operation of the series update modules, feedback also may be used to assess the quality of a source of content, such as an update module or a specific series, given that some series update modules may abstract what shows will actually be delivered in any series that utilize the series update modules. Such a quality assessment may be referred to herein as "scoring" and the like, and the result of the assessment may be referred to herein as a "reputation score." The reputation score may indicate information such as how many viewers actually watched and liked the content produced by the series update module. Further, depending upon how a reputation score is presented, the reputation score may indicate at a glance whether the source of the video content for a series may be of interest to a potential new viewer.

Figure 3:
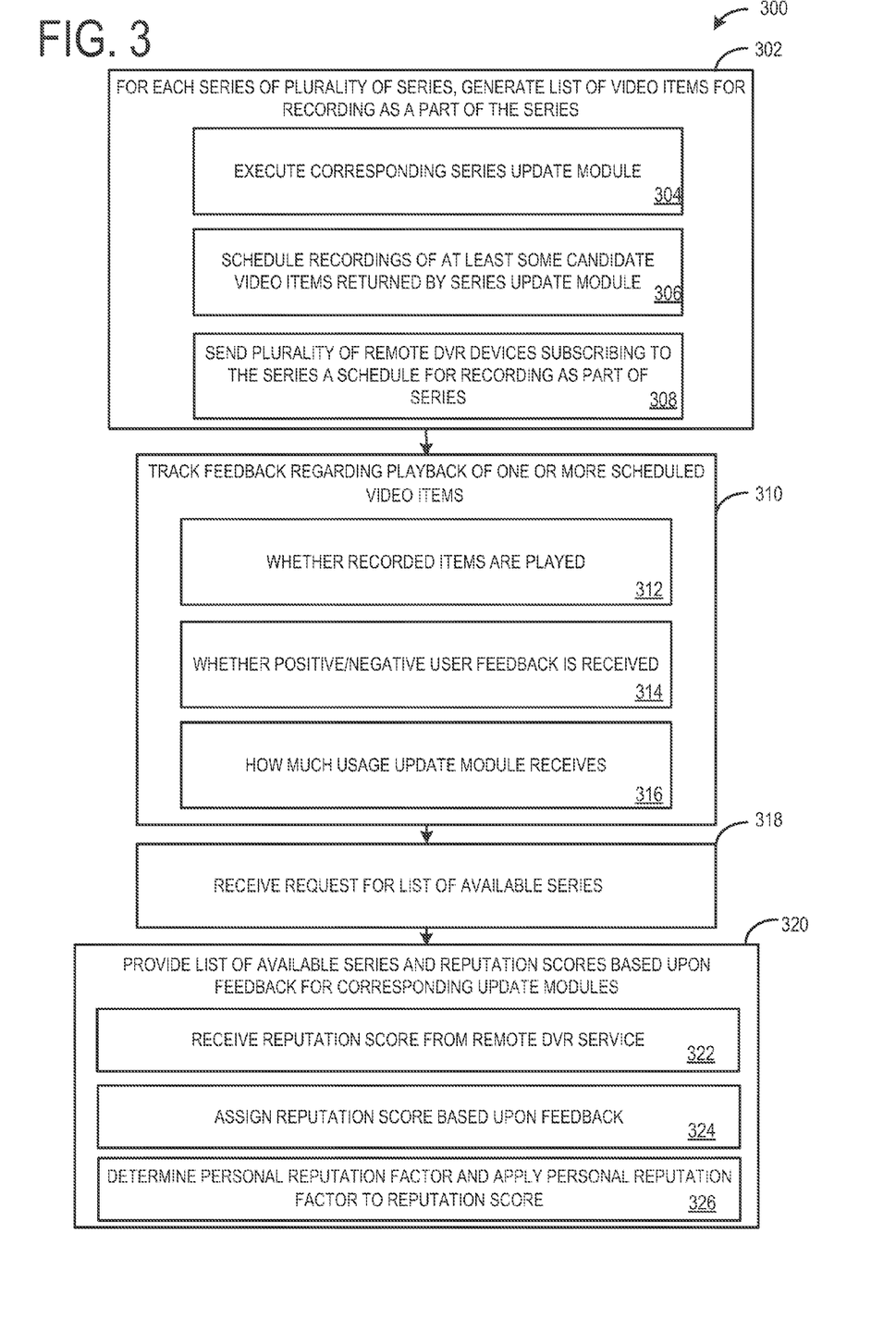
FIG. 3 shows an embodiment of a method of assigning a reputation score to one or more of a video series and a video series update module based upon feedback.

FIG. 3 shows a flow diagram depicting an embodiment of a method 300 of assigning reputation scores to a plurality of series update modules. While described in the context of a remote DVR service that schedules recordings for client devices, it will be understood that method 300, as well as other embodiments herein, may be implemented in any other suitable use environment. For example, in some embodiments, both scheduling and recording may be performed remotely from each end user. In such an embodiment, as mentioned above, the recording device may be implemented as a cloud-based service that may be shared across multiple users and/or that allocates storage per user. Such a recording service may or may not be combined with a scheduling service. As another non-limiting example, in other embodiments, scheduling-related tasks may be performed on client devices, while recording is implemented as a cloud-based service.

Method 300 comprises, at 302, for each series of a plurality of series, generating a list of video items for recording as a part of the series. As described above, such lists may be generated for each series by executing, at 304, a corresponding series update module that returns candidate video items for potential inclusion in the series, and then scheduling, at 306, recordings of at least some candidate video items returned by series update module. In embodiments in which the scheduling occurs on a remote DVR service, method 300 may comprise, at 308, sending schedules of video items to record as a part of the series to a plurality of remote DVR devices. In embodiments where the scheduling occurs on client DVR devices, process 308 may be omitted.

After sending the schedules of video items to record, method 300 comprises, at 310, tracking feedback of the video items from the plurality of remote DVR devices. As described above, such feedback may include, but is not limited to, information regarding whether recorded items are played 312, information regarding whether positive/negative user feedback is received 314, and/or how much usage each update module receives 316. It will be understood that tracking the feedback may include sending the feedback to a remote DVR service and/or receiving the feedback at a remote DVR service.

Based upon the feedback received, method 300 comprises, at 318, assign a reputation score to the series update module. The reputation score may be assigned to the update module itself, or to the particular instance of the update module that corresponds to the series that was updated. The reputation score may be determined in any suitable manner. As one non-limiting example, in some embodiments, a reputation score for a series update module may comprise, on a per-show or per-update module basis, a numerical value derived from a combination of the total percentage of shows watched out of shows recommended, like/dislike actions by users globally and/or per recommended show, a mean number of instances of a series update module (e.g. how many series utilizing the series update module) are followed by each user, a percentage of users that utilize the series update module, and a percentage of users who have used the series update module that have deleted the last instance of the series update module. Such a reputation score may be calculated globally, or may be influenced by a user's social graph, for example, by weighting a user's friends more heavily than the general population.

Continuing with FIG. 3, method 300 next comprises, at 318, receiving a request for a list of available series, and at 320, providing the list of available series and the reputation score for each of the series. In embodiments in which the list is determined on a client DVR device, the reputation scores may be obtained from a remote DVR service, as indicated at 322, and the list and reputation score(s) may be provided via a graphical user interface. Likewise, in embodiments in which the list is determined on a remote DVR service, the request may be received from a client DVR device, the reputation score(s) may be determined based upon the feedback received, as indicated at 324, and the list and reputation score (s) may be provided to the client DVR device. The reputation score for a series may represent the global score for the series update module corresponding to that series (such that the reputation score applies to all instances of that series update module), or may represent the score for the particular instance of the series update module corresponding to that specific series.

Further, in some embodiments, method 300 may comprise, at 326, determining a personal reputation factor based upon a correlation of a user's playback statistics with one or more other users, and then applying the personal reputation factor to the reputation score. A personal reputation factor may be used, for example, with a user-defined trend group series update module, such that users with viewing interest more similar to the principal viewer (e.g. the viewer that defines the group) have more influence on the reputation score for a series. A personal reputation factor may be determined in any suitable manner. For example, in some embodiments, the personal reputation factor may be determined by correlating a viewer's watched/liked recordings with that of the principal viewer.

Figure 4:
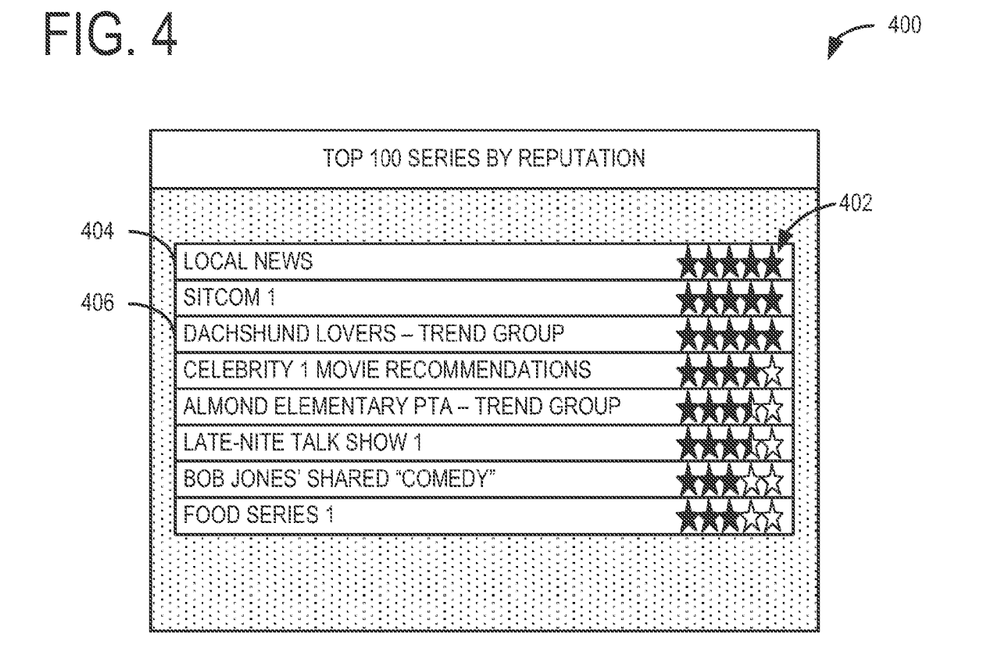
FIG. 4 shows an example embodiment of a user interface depicting a list of available series and an embodiment of a reputation score for each series.

The reputation score may be presented to a viewer in any suitable manner. For example, in some embodiments, a list of available series for subscription displayed during a content discovery process, as well as a list of subscribed series, may both an overall reputation score for each series, and a user may be able to select the series to view detailed statistics behind the reputation score. FIG. 4 shows an example embodiment of a series discovery page 400 for display on a user interface, wherein a reputation score for each series is represented by stars 402 next to each series name. As can be seen, linear content series 404 (e.g. ordinary television series) and non-linear content series 406 (e.g. series with at least some content taken from a non-linear content source and/or two or more different linear series) are presented on a same user interface. The reputation score for each series may be a global reputation score, or may be personalized via a personal reputation factor, as described above.

Figure 5:
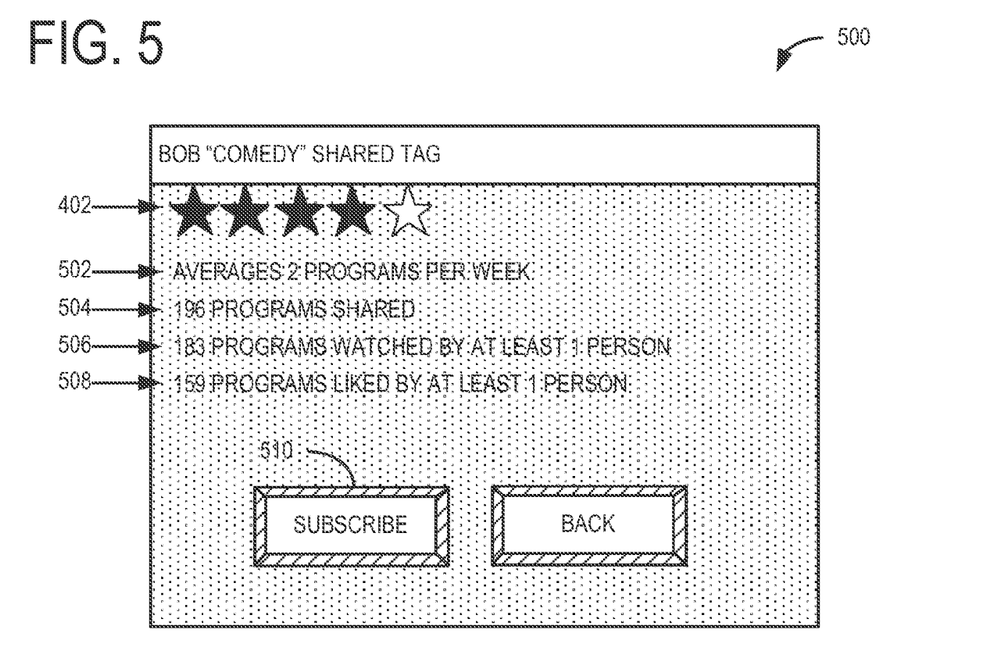
FIG. 5 shows an example embodiment of a user interface depicting a detailed view of one of the series of the user interface of FIG. 4.

A user that would like more information on a series may select the series to bring up a user interface with detailed information regarding the reputation score. FIG. 5 shows an example embodiment of a reputation score page for a non-linear feed-based series from the user interface of FIG. 4. As shown, the reputation score page shows an average frequency of recordings 502 for the series, a total number of recordings recommended 504 in the series, a number of recommended programs actually played by at least one person 506, and a number of recommended programs liked by at least one person 508. Further, a subscription button 510 allows a user to choose to subscribe to the series. It will be understood that the depicted information is shown for the purpose of example, and that any other suitable information may be included on the series page.

In some embodiments, a user may be able to build a personal reputation based upon the reputation of their shared content. Such a personal reputation may serve as a basis to earn achievements and/or awards. As a non-limiting example, if a user earns a reputation score of four stars or greater, a user may receive a "viewer of influence" achievement.

In some instances, a user that provides a feed may not be a subscriber to the DVR service. Thus, in some embodiments, such a user may have access to an external portal at which owners of a feed may view statistics about their recommendations. Such a portal may also tie into an advertizing/monetization mechanism, and therefore allow non-viewer feed originators to track advertising revenue. Access to such a portal may be granted manually, or by registering to administer their feed by proving ownership of the feed (e.g. by adding a hidden comment to the feed with a specific identification). Likewise, reports with statistics may be sent to registered owners, for example, by email on a periodic basis.

In some embodiments, if a user and/or a series update module generates candidate video items that are not watched by others, the user and/or series update module may receive negative feedback. For example, recordings that do not result in watched shows may lower the weighting factor for that person (either in the trend group or globally), and/or the reputation score of the series update module may be lowered. In other embodiments, such negative feedback may be omitted.

The above described methods and processes may be tied to a computing system including one or more computers. For example, referring again to FIG. 1, each DVR system 102 and the DVR service 104 may be implemented as a computer application, computer service, computer API, computer library, and/or other computer program product.

Figure 6:
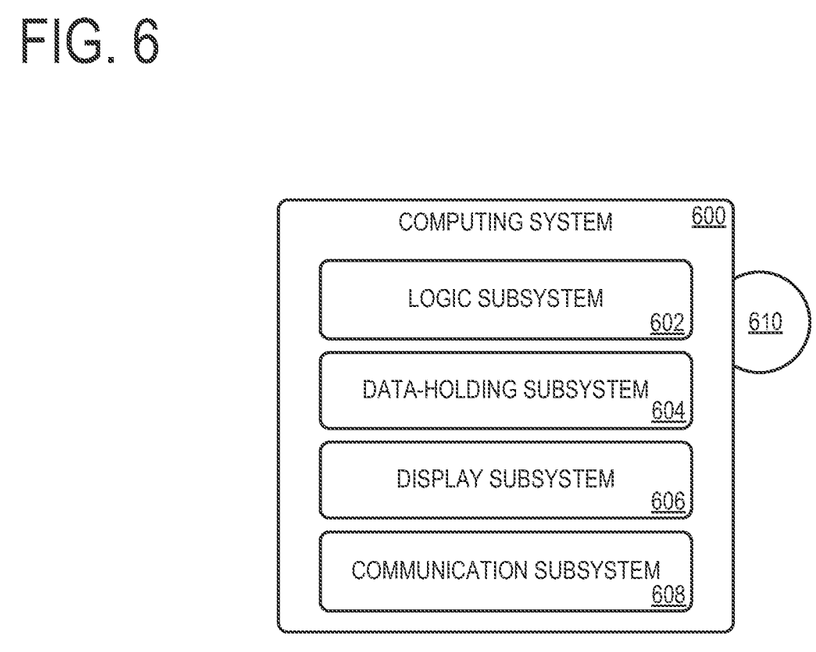
FIG. 6 shows a block diagram of an embodiment of a computing system.

FIG. 6 schematically shows a nonlimiting computing system 600 that may perform one or more of the above described methods and processes. Computing system 600 is shown in simplified form. It is to be understood that virtually any computer architecture may be used without departing from the scope of this disclosure. In different embodiments, computing system 600 may take the form of a mainframe computer, server computer, desktop computer, laptop computer, tablet computer, home entertainment computer, network computing device, mobile computing device, mobile communication device, gaming device, remote control, etc.

Computing system 600 includes a logic subsystem 602 and a data-holding subsystem 604. Computing system 600 may optionally include a display subsystem 606, communication subsystem 608, and/or other components not shown in FIG. 6. Computing system 600 may also optionally include user input devices such as keyboards, mice, game controllers, cameras, microphones, and/or touch screens, for example.

Logic subsystem 602 may include one or more physical devices configured to execute one or more instructions. For example, logic subsystem 602 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 602 may include one or more processors that are configured to execute software instructions. Additionally or alternatively, logic subsystem 602 may include one or more hardware or firmware logic machines configured to execute hardware or firmware instructions. Processors of logic subsystem 602 may be single core or multicore, and the programs executed thereon may be configured for parallel or distributed processing. Logic subsystem 602 may optionally include individual components that are distributed throughout two or more devices, which may be remotely located and/or configured for coordinated processing. One or more aspects of logic subsystem 602 may be virtualized and executed by remotely accessible networked computing devices configured in a cloud computing configuration.

Data-holding subsystem 604 may include one or more physical, non-transitory, devices configured to hold data and/or instructions executable by logic subsystem 602 to implement the herein described methods and processes. When such methods and processes are implemented, the state of data-holding subsystem 604 may be transformed (e.g., to hold different data).

Data-holding subsystem 604 may include removable media and/or built-in devices. Data-holding subsystem 604 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 604 may include devices with one or more of the following characteristics: volatile, nonvolatile, dynamic, static, read/write, read-only, random access, sequential access, location addressable, file addressable, and content addressable. In some embodiments, logic subsystem 602 and data-holding subsystem 604 may be integrated into one or more common devices, such as an application specific integrated circuit or a system on a chip.

FIG. 6 also shows an aspect of the data-holding subsystem in the form of removable computer-readable storage media 610, which may be used to store and/or transfer data and/or instructions executable to implement the herein described methods and processes. Removable computer-readable storage media 610 may take the form of CDs, DVDs, HD-DVDs, Blu-Ray Discs, EEPROMs, and/or floppy disks, among others.

It is to be appreciated that data-holding subsystem 604 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module" and "program" may be used to describe an aspect of computing system 600 that is implemented to perform one or more particular functions. In some cases, such a module or program may be instantiated via logic subsystem 602 executing instructions held by data-holding subsystem 604. It is to be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and "program" are meant to encompass individual or groups of executable files, data files, libraries, drivers, scripts, database records, etc.

It is to be appreciated that a "service", as used herein, may be an application program executable locally on a client DVR device and/or on a remote DVR service across multiple user sessions and available to one or more system components, programs, and/or other services. In some implementations, a service may run on a server responsive to a request from a client.

When included, display subsystem 606 may be used to present a visual representation of data held by data-holding subsystem 604. As the herein described methods and processes change the data held by the data-holding subsystem, and thus transform the state of the data-holding subsystem, the state of display subsystem 606 may likewise be transformed to visually represent changes in the underlying data. Display subsystem 606 may include one or more display devices utilizing virtually any type of technology. Such display devices may be combined with logic subsystem 602 and/or data-holding subsystem 604 in a shared enclosure, or such display devices may be peripheral display devices.

When included, communication subsystem 608 may be configured to communicatively couple computing system 600 with one or more other computing devices. Communication subsystem 608 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 600 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing system, a method of adapting an identification and/or scheduling of video items for recording based on usage, the method comprising:

detecting a trigger to perform a series update, the series update comprising an update of a trend group series in which trend group activity of a weighted threshold plurality of members of a trend group regarding a selected video item triggers an automatic scheduling of the selected video item for recording by other members of the trend group, the trigger comprising an exceeding of a threshold ratio, the threshold ratio comprising a quotient of a sum of weighted user count values for members of the trend group that manually scheduled the selected video item for recording before the weighted threshold plurality of members was reached and a total sum of all weighted user count values of the trend group;

upon detection of the trigger, determining one or more video items to record for the trend group series by providing input of weighted user count values to a series update module that returns candidate video items for inclusion in the series, the candidate video items being determined based upon the threshold plurality of members of the trend group having manually scheduled the candidate video items for recording;

automatically scheduling zero or more of the candidate video items for recording;

tracking feedback related to video item playback of one or more video items that were recorded based upon the scheduling; and based upon the feedback, adapting the input provided to the series update module for a later series update by modifying a weighting factor of the weighted user count value for a trend group member that manually scheduled the selected video item for recording before the weighted threshold number of members was reached.

2. The method of claim 1, wherein modifying the weighting factor for the trend group member comprises modifying the weighting factor for each trend group member that manually scheduled the selected video item for recording before the weighted threshold number of members was reached.

3. The method of claim 1, wherein the input comprises a priority value assigned based upon a comparison between a number of viewers that watch a particular video item and a number of viewers that recorded the particular video item, and wherein adapting the input comprises modifying the priority value based upon the comparison.

4. The method of claim 1, wherein the feedback comprises one or more of information regarding whether recorded video items are played, information regarding whether video items played receive positive and/or negative user feedback, and information regarding an amount of usage of the series update module.

5. The method of claim 4, further comprising assigning a reputation score to one or more of the series and the series update module based upon the feedback.

6. The method of claim 5, further comprising determining a personal reputation factor based upon a correlation of playback statistics of a user with playback statistics of one or more other users.

7. The method of claim 1, wherein the computing system comprises a client digital video recording device.

8. The method of claim 1, wherein the computing system comprises a remote digital video recording service.

9. A computing system comprising:
a processor; and
a storage device comprising instructions executable by the processor to adapt an identification and/or scheduling of video items for recording based on usage by
detecting a trigger to perform a series update, the series update comprising an update of a trend group series in which trend group activity of a weighted threshold plurality of members of a trend group regarding a selected video item triggers an automatic scheduling of the selected video item for recording by other members of the trend group, the trigger comprising an exceeding of a threshold ratio, the threshold ratio comprising a quotient of a sum of weighted user count values for members of the trend group that manually scheduled the selected video item for recording before the weighted threshold plurality of members was reached and a total sum of all weighted user count values of the trend group;
upon detection of the trigger, determining one or more video items to record for the trend group series by providing input of weighted user count values to a series update module that returns candidate video items for inclusion in the series, the candidate video items being determined based upon the threshold plurality of members of the trend group having manually scheduled the candidate video items for recording;
automatically scheduling zero or more of the candidate video items for recording;
tracking feedback related to video item playback of one or more video items that were recorded based upon the scheduling; and
based upon the feedback, adapting the input provided to the series update module for a later series update by modifying a weighting factor of the weighted user count value for a trend group member that manually scheduled the selected video item for recording before the weighted threshold number of members was reached.

10. The computing system of claim 9, wherein modifying the weighting factor for the trend group member comprises modifying the weighting factor for each trend group member that manually scheduled the selected video item for recording before the weighted threshold number of members was reached.

11. The computing system of claim 9, wherein the input comprises a priority value assigned based upon a comparison between a number of viewers that watch a particular video item and a number of viewers that recorded the particular video item, and wherein adapting the input comprises modifying the priority value based upon the comparison.

12. The computing system of claim 9, wherein the feedback comprises one or more of information regarding whether recorded video items are played, information regarding whether video items played receive positive and/or negative user feedback, and information regarding an amount of usage of the series update module.

13. The computing system of claim 12, further comprising assigning a reputation score to one or more of the series and the series update module based upon the feedback.

14. The computing system of claim 13, further comprising determining a personal reputation factor based upon a correlation of playback statistics of a user with playback statistics of one or more other users.

15. The computing system of claim 9, wherein the computing system comprises a client digital video recording device.

16. The computing system of claim 9, wherein the computing system comprises a remote digital video recording service.

* * * * *